United States Patent [19]

Suska

[11] E Re. 30,716

[45] Reissued Aug. 18, 1981

[54] SWITCH ACTIVATING HINGE HAVING RECIPROCATING CAM FOLLOWER SWITCH ACTUATOR

[75] Inventor: Charles R. Suska, Roxbury, Conn.

[73] Assignee: The Stanley Works, New Britain, Conn.

[21] Appl. No.: 932,760

[22] Filed: Aug. 10, 1978

Related U.S. Patent Documents

Reissue of:

[64] Patent No.: 4,066,857
Issued: Jan. 3, 1978
Appl. No.: 598,716
Filed: Jul. 24, 1975

[51] Int. Cl.[3] ..... H01H 3/16

[52] U.S. Cl. ..... 200/61.7

[58] Field of Search ..... 200/61.7, 61.8, 61.81, 200/61.82, 153 L, 153 LA, 153 T, 332; 335/205

[56] References Cited

U.S. PATENT DOCUMENTS

| | | | |
|---|---|---|---|
| 449,428 | 6/1893 | Hull | 200/61.7 |
| 615,209 | 11/1898 | Baxter | 200/61.7 |
| 1,861,547 | 6/1932 | Parkhurst | 200/61.7 |
| 1,992,209 | 2/1935 | Herbster | 240/5 |
| 2,601,410 | 6/1952 | McKay | 200/61.7 |
| 2,641,662 | 6/1973 | Liley | 200/61.7 |
| 3,659,063 | 4/1972 | Peterson | 200/61.7 |
| 3,715,537 | 2/1973 | Peterson | 200/61.7 |
| 3,729,603 | 4/1973 | Foltz | 200/61.7 |
| 3,803,375 | 4/1974 | Foltz | 200/61.7 |
| 3,806,852 | 4/1974 | Suska | 335/205 |
| 3,809,837 | 5/1974 | Yoshioka | 200/332 X |
| 3,838,234 | 9/1974 | Peterson | 200/61.7 |
| 3,840,715 | 10/1974 | Gwozdz | 200/61.7 |
| 3,896,404 | 7/1975 | Peterson | 335/205 |
| 4,049,934 | 9/1977 | Newlon | 200/61.7 |
| 4,066,857 | 1/1978 | Suska | 200/61.7 |

FOREIGN PATENT DOCUMENTS

| | | | |
|---|---|---|---|
| 25772 | 5/1923 | France | 200/61.81 |
| 1182185 | 2/1970 | United Kingdom | 200/61.7 |
| 1279381 | 6/1972 | United Kingdom | 200/61.7 |

OTHER PUBLICATIONS

Grayhill Inc. Engineering Catalog, G-374A R2; copyrighted 1974, pp. 57 and 72.

*Primary Examiner*—James R. Scott
*Attorney, Agent, or Firm*—Brumbaugh, Graves, Donohue & Raymond

[57] ABSTRACT

A switch activating hinge comprises two hinge leaves having aligned knuckles, a hinge pin fixed in a knuckle of the first leaf and extending into a knuckle of the second leaf for aligning the leaves for relative pivotal movement with respect to each other, and a switch in the knuckle of the second leaf adjacent the hinge pin. Means are provided on the hinge pin and the switch for operating the switch in response to relative pivotal movement of the hinge pin with respect to the knuckle of the second leaf.

8 Claims, 7 Drawing Figures

SWITCH ACTIVATING HINGE HAVING RECIPROCATING CAM FOLLOWER SWITCH ACTUATOR

Matter enclosed in heavy brackets [ ] appears in the original patent but forms no part of this reissue specification; matter printed in italics indicates the additions made by reissue.

BACKGROUND OF THE INVENTION

In the development of security devices for monitoring the entrances to and within a building, door monitoring switches are known which will activate a remote alarm in the security system when the door is moved in relation to the door jamb. Typically, these switch devices are held in the hinge leaves of a door hinge so as to be hidden from view when the door is closed. Hinges of this type may have an abutment surface on one hinge leaf contacting a plunger operating a switch hidden in the other leaf, as shown in U.S. Pat. No. 3,715,537, to Peterson, or U.S. Pat. No. 3,729,603, to Foltz, for example.

A more sophisticated approach to the problem is shown in U.S. Pat. No. 3,806,852 to Suska, in which a magnet hidden by one leaf magnetically operates a switch concealed in the other leaf, the security device thus being completely hidden from view regardless of whether the door is open or closed. Another known arrangement, described in U.S. Pat. No. 3,840,715, to Gwozdz, consists of a switch in the door jamb behind the hinge leaf which is operated by a pushrod concealed in the hinge leaf, the pushrod being driven at one end by a cammed surface on the hinge pin when the hinge pin is rotated during movement of the door with respect to the door jamb. When mortising is required, these switch arrangements, which include projections from the rear surface of the hinge leaf or leaves, increase the cost of using the system.

SUMMARY OF THE INVENTION

It is therefore a principal object of the present invention to provide a switch activating hinge which is inexpensive, simple to install and operate, which completely conceals the switch device whether the door is open or closed, and further requires a minimum of special construction. According to the invention, a switch activating hinge comprises first and second hinge leaves having aligned knuckles, a hinge pin fixed in a knuckle of the first leaf and extending into a knuckle of the second lead for aligning the leaves for relative pivotal movement with respect to each other, a switch in the knuckle of the second leaf adjacent the hinge pin, and means on the hinge pin and the switch for operating the switch in response to relative pivotal movement of the hinge pin with respect to the knuckle of the second leaf.

In preferred embodiments of the present invention, the means for operating the switch consist of a driver on the end of the hinge pin and a follower associated with the switch, the driver engaging the follower for translating the relative pivotal movement of the hinge pin with respect to the knuckle of the second leaf into movement of the follower to operate the switch. The switch activating hinge further includes a device for adjusting the operative axial position of the hinge pin with respect to the switch, and a device for adjusting the relative angular position of the hinge pin with respect to the switch in order to establish a predetermined angle between the first and second hinge leaves at which the switching operation occurs. In addition, the switch activating hinge may have a concealed passage in the second leaf and the knuckle of the second leaf communicating with the interior of the knuckle of the second leaf for threading electrical conductors through the passage into the interior of the knuckle of the second leaf to the switch contained therein, the hinge when installed concealing the electrical conductors from view and giving the outward appearance of a conventional load bearing hinge.

In a preferred embodiment of the invention, the driver is a camming surface on the end of the hinge pin and the follower includes a cam-following surface, the driver cooperating with the follower such that relative rotation of the hinge pin results in axial displacement of the follower and operation of the switch. In another embodiment of the invention, the driver is a key member on the end of the hinge pin and the follower includes a rotatable switch-actuating member having a recessed slot therein for receiving the key member, the key member engaging the switch-actuating member such that relative rotation of the hinge pin results in rotation of the switch-actuating member and operation of the switch.

BRIEF DESCRIPTION OF THE DRAWINGS

For a better understanding of the invention, reference may be made to the following description of two exemplary exbodiments, taken in conjunction with the figures of the accompanying drawings, in which.

DETAILED DESCRIPTION

Figure 1:
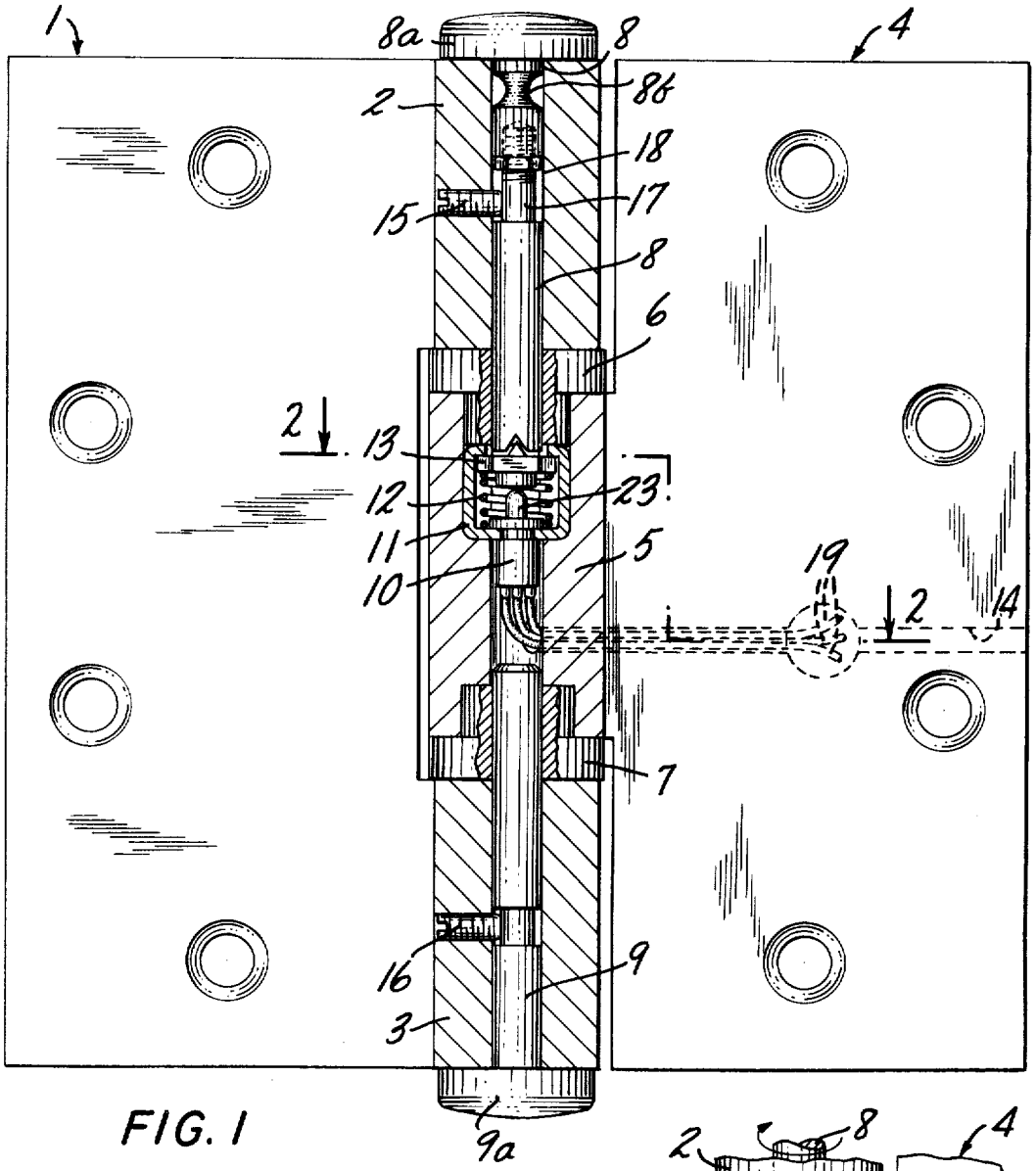
FIG. 1 is a front sectional view of a switch activating hinge according ot the invention.
Figure 2:
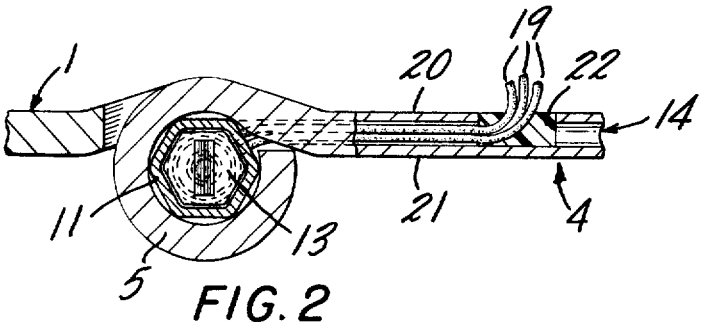
FIG. 2 is a top sectional view of the hinge in FIG. 1 taken along view line 2—2.
Figure 3:
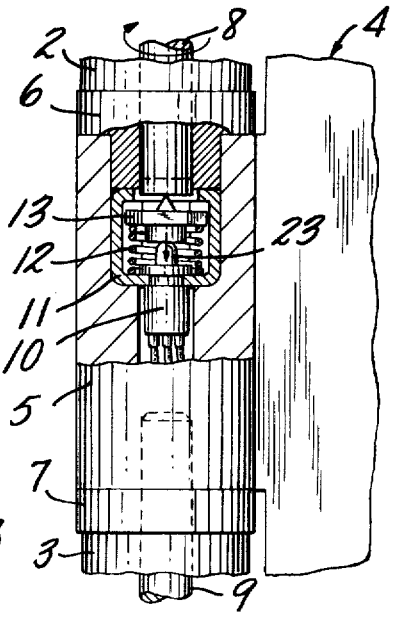
FIG. 3 is a detail of the hinge of FIG. 1 showing the operation of the switch when the hinge leaves are rotated.

In one embodiment of the invention, illustrated in FIGS. 1-3, a switch activating hinge includes a first hinge leaf 1 having knuckles 2 and 3 and a second hinge leaf 4 having a knuckle 5 which carries bearing assemblies 6 and 7. Hinge pins 8 and 9 pass through the knuckles 2 and 3, respectively, and enter the bearings 6 and 7, respectively. If the bearings 6 and 7 are not used, the ends of hinge pins 8 and 9 would enter the ends of the knuckle 5 directly, or would enter bushings in the ends of the knuckle 5. The knuckles 2, 3 and 5 of the hinge leaves 1 and 4 are aligned by the hinge pins 8 and 9 to permit pivotal movement of the hinge leaves relative to each other.

The knuckle 5 of the second leaf 4 is formed to accommodate a switch assembly consisting of a switch 10, preferably of the snap-action type, secured through one end of a case 11 within which is a spring 12 and a follower 13. While the switch 10 is shown as a single pole double throw switch with three contacts, other suitable switch units, including a single pole single throw switch, could be used. Preferably, the case 11 has a hexagonal cross-section (FIG. 2) so that its outer corners lightly press-fit into the bore of the knuckle 5 to prevent rotation of the case within the bore. Further, the inner flats of the case 11 slidably guide the correspondingly hexagonal perimeter of the follower 13 such that the follower is constrained from rotational movement within the case. The other end of the case 11 is crimped to retain the follower 13 and the spring 12 therein. A plunger 23, adjacent to a surface of the follower facing toward the switch, is axially displaceable for actuating the switch, the spring 12 serving to bias the follower 13 away from the actuating plunger toward the crimped end of the case 11.

The follower 13 has a diametral ridge raised from the surface of the follower facing away from the switch 10. The ridge may generally have an inverted "V" cross-section, as shown in FIGS. 1 and 3. The end of the hinge pin 8 adjacent the switch assembly has a camming surface generally consisting of a diametral, "V"-shaped groove corresponding to the ridge on the follower 13.

The length of the hinge pin 8 is such that when the hinge is assembled the head of the hinge pin is seated against one end of the knuckle 2 of the first hinge leaf 1, and the stem of the hinge pin extends into the knuckle 5 of the second hinge leaf 4 to locate the "V"-shaped groove on the end of the hinge pin for engagement with the inverted "V" ridge of the follower 13. The hinge pins 8 and 9 are fixed in their respective knuckles 2 and 3 by means of set screws 15 and 16, respectively.

By proper selection of the height of the ridge on the follower 13 and the depth of the groove in the hinge pin 8, the grooved camming surface engages the ridge of the follower and drives the follower into axial movement against the plunger 23 to operate the switch (FIG. 3) upon pivotal movement of the hinge leaves 1 and 4 with respect to each other. Correct operation of the switch assembly is achieved by the proper choice of clearance between the follower 13 and the switch actuating plunger 23, and of suitable switch characteristics. The angle between the hinge leaves at which the switching operation occurs can be pre-established by adjusting the angular position of the "V" groove in the hinge pin relative to the ridge on the follower. This adjustment is made by loosening the set screw 15, rotating the hinge pin to the desired position in relation to the switch assembly, then retightening the set screw. For axially positioning the end of the hinge pin in relation to the follower, the hinge pin 8 may further be made adjustable in length by utilizing, for example, the two part stem shown in FIG. 1 interconnected by a joint piece 17, forming an annular groove, which is fixed in one part of the stem and threaded into the other part and secured thereto by means of a lock nut 18.

Weakened section 8b is provided between the annular groove and the head 8a. Thus any attempt to tamper with the rotational adjustment of the pin 8 by twisting the head 8a will cause breakage of the pin at the weakened section 8b.

Conductor leads connect the switch to an external electrical circuit (not shown in the drawings) preferably by threading insulated wires 19 through a passageway in the second hinge leaf 4 and the knuckle 5 of the second leaf. The passageway is shown as a concealed tunnel 14 extending through the thickness of the second hinge leaf generally parallel to the exterior surfaces 20 and 21 thereof and through the wall of the knuckle 5 thereby communicating into the bore of the knuckle at a location near the terminals of the switch.

Providing an exit for the wires, an opening 22 in the rear exterior surface of the second hinge leaf, i.e., the surface which adjoins the door or door frame, intersects the tunnel 14 at a point sufficiently spaced from the knuckle to permit the opening 22 to be hidden from view when the hinge is installed on the door and door frame. In this manner, the switch and the wires connected thereto are completely concealed, whether the door is open or closed, and the switch device cannot be disarmed without removing the hinge from the door or door frame.

Figure 4:
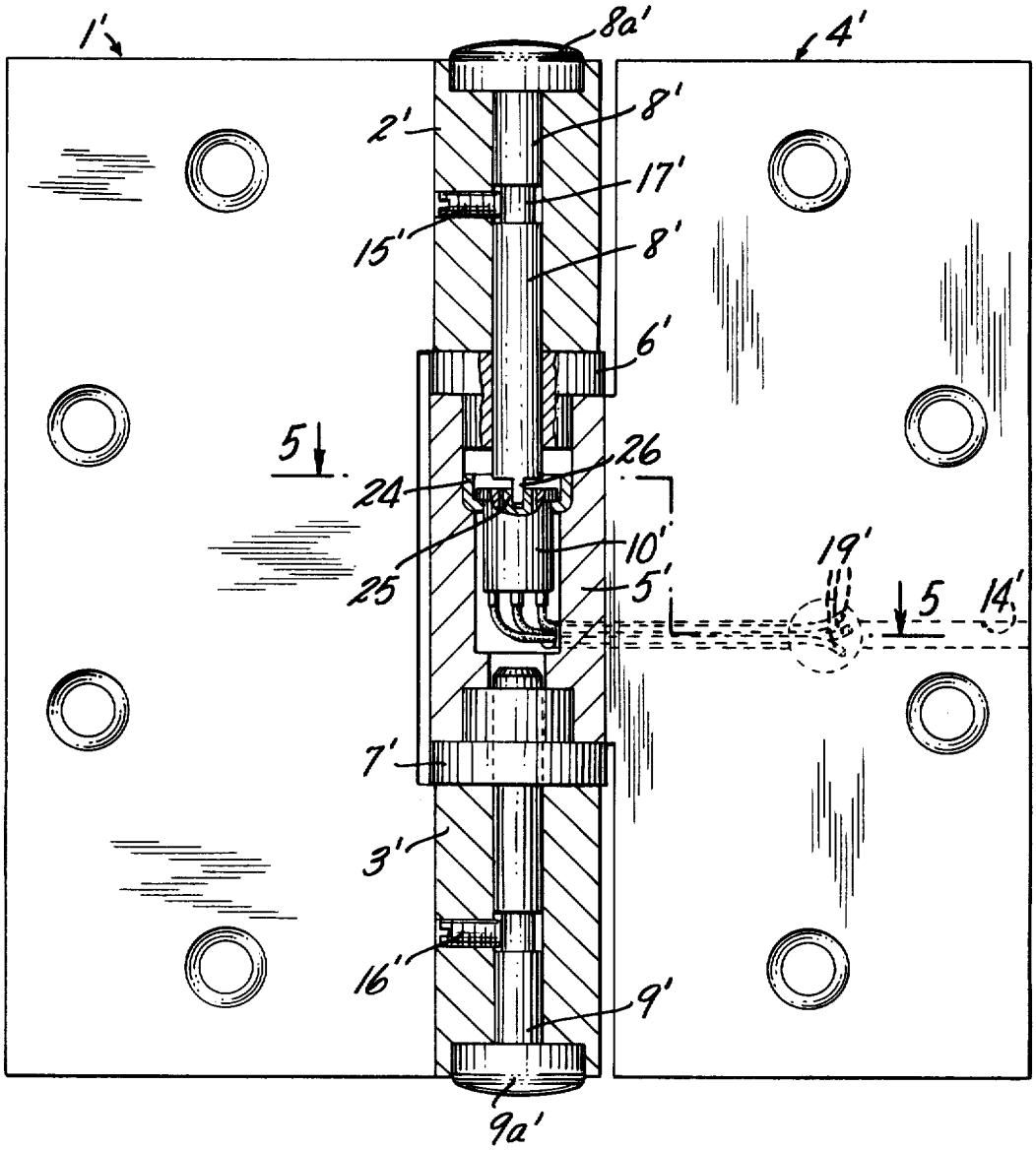
FIG. 4 is a front sectional view of another switch activating hinge according to the present invention.
Figure 5:
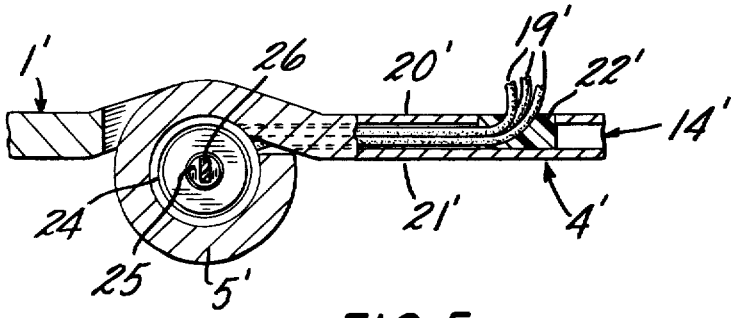
FIG. 5 is a top sectional view of the hinge in FIG. 4 taken along view line 5—5.

In another embodiment of the present invention, shown in FIGS. 4 and 5, the hinge leaves, knuckles, hinge pins, and concealed passageway are arranged similar to the switch activating hinge described above, and the various corresponding parts have been designated by like primed reference numerals. However, instead of a plunger-actuated switch, a rotary switch 10' is secured in the hinge knuckle 5' by means of the switch being held in an adapter bushing 24 which is seated tightly in the bore of the knuckle. The switch 10' may be of the commercially available type, such as the Grayhill Series 75 for example, having a "screwdriver slot" on the end of a rotor 25 which actuates the switch. The hinge pin 8' is appropriately formed at the end adjacent the switch assembly, having a blade or key member 26, shown in FIG. 4, which is received directly into the slot in the rotor 25. Heads 8a' and 9a' on the pins 8 and 9 are recessed into the knuckle ends to prevent tampering with the rotary adjustment of the pin 8.

The switch is thus operated by direct engagement of the end of the hinge pin with the rotor, and is actuated by the relative rotation of the hinge pin with respect to the knuckle 5' of the second hinge leaf 4' when the hinge leaves are pivoted relative to each other. The rotary switch 10' preferably has a number of circumferentially spaced contact points, engageable by the rotor, for closing one or more circuits at predetermined door angles, of which one contact point may be selected for pre-establishing the angle between the hinge leaves at which the switching operation occurs.

Figure 6:
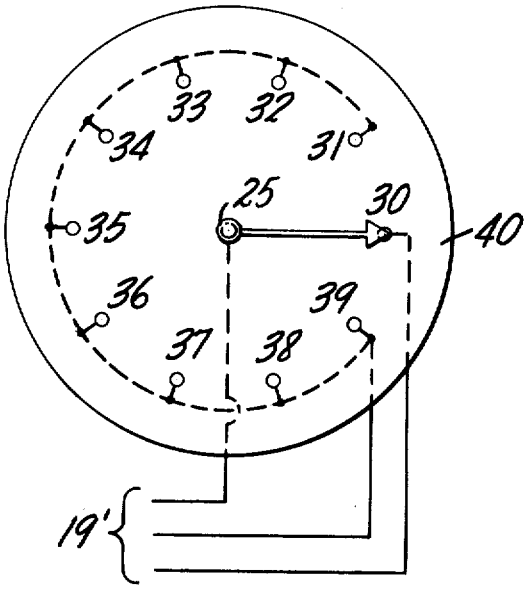
FIG. 6 is a circuit diagram showing diagrammatically one configuration of the rotary switch in the hinge of FIG. 4.

As illustrated diagrammatically in FIG. 6, the rotary switch 10' includes the rotor 25 and a number of contact points 30–39 on a suitable support 40. One contact point 30 is selected for closing a circuit with the rotor indicating when the hinge leaves are in the angular position with respect to each other that corresponds with the door being closed in the door frame. The other contact points 31–39 are all connected together for closing another circuit with the rotor indicating that the hinge leaves are in any of a range of angular positions when the door is open with respect to the door frame. Generally, only half of the contact points are necessary to the switching operation for doors which open in one direction only, but use of the full number of contact points is preferred in order to allow the hinge to be used rotationally in either a left or right handed sense, or both.

Figure 7:
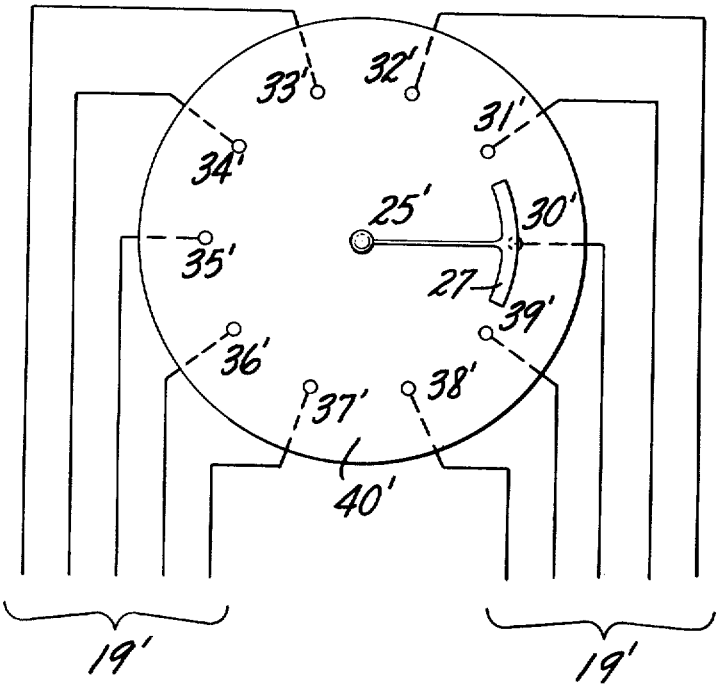
FIG. 7 shows another configuration of the rotary switch in the hinge of FIG. 4.

A further utility of the preferred switch activating hinge having a rotary switch is shown diagrammatically in FIG. 7, in which elements corresponding to the rotary switch described above are referenced by like primed numerals. The rotor 25' has an arcuate wiping blade 27 which is dimensioned such that in any angular position of the rotor the blade engages at least one of the circumferentially spaced contact points 30'–39' on the support 40, each of which is connected for closing a circuit when engaged by the blade. In this manner, at least one circuit is closed at any particular angular position of the rotor 25', and the angular position of the door with respect to the door frame can thereby be indicated at a monitoring station remote from the location of the door. With the use of ten conductors 19', preferably several tunnels 14' are provided in the hinge leaf to accommodate the conductors.

It will be understood that the above described embodiments are merely exemplary and that persons skilled in the art may make variations and modifications without departing from the spirit and scope of the invention. All such modifications and variations are intended to be within the scope of the invention as defined in the appended claims.

I claim:

1. A switch activating hinge comprising first and second hinge leaves having axially aligned knuckles, a hinge pin fixed in the knuckle of the first leaf and extending into a knuckle of the second leaf for aligning the leaves for pivotal movement with respect to each other, a separate switch unit, including a switch actuating plunger aligned with the axis of said knuckles, said switch unit being fixed in the knuckle of the second leaf and positioned adjacent the end of said hinge pin, a camming surface on one end of said hinge pin, follower means positioned between said camming surface and said plunger, said follower means comprising a non-circular element mounted within a corresponding non-circular case fixed in the knuckle of the second leaf and adapted for axial movement therein, said element having a cam following surface engaging said camming surface and being urged against said camming surface by a spring, whereby the relative pivotal movement between said hinge pin and said non-circular element causes axial displacement of said element, causing said element to engage said plunger and actuate said switch.

2. The switch activating hinge as defined in claim 1, in which means are provided for adjusting the relative angular position of the hinge pin with respect to the switch unit in order to establish a predetermined angle between the first and second hinge leaves at which the switching operation occurs.

3. The switch activating hinge as defined in claim 1, wherein the hinge pin is adjustable in length for operatively adjusting the relative axial position of the driver means with respect to the follower means.

4. A switch activating hinge as specified in claim 1 wherein there are provided means engaging a portion of said hinge pin for fixing it in the knuckle of said first leaf, wherein the other end of said hinge pin is provided with a head, and wherein there is provided a weakened section of the hinge pin between said head and the engaged portion of said pin.

*5. A hinge construction comprising first and second pivotally connected hinge leafs, each said leaf including means adapting same for attachment to a door or a door frame, or the like, each leaf further including at least one knuckle which is disposed adjacent to and is movable relative to the knuckle on the other of said leaves, an electrical circuit component carried by one of said knuckles, actuator means associated with said circuit component, and capable of producing a change in condition thereof, operating means carried by the other of said knuckles, such that upon movement of said hinge leaves relative to each other, said operating means will be moved relative to said circuit component and said actuator means to operate said actuator means and thereby produce a change in the condition of said electrical circuit component, which change in condition may be used as an indication of a change in the relative orientation of said hinge leaves, said actuator means comprising a movable plunger on said component for altering the condition thereof, and piston means non-rotatably mounted with respect to said circuit component, but being movable axially with respect to said circuit component for engagement and operation of said plunger, said piston means including cam means on the end thereof remote from said circuit component, said operating means carried by the other of said hinge knuckles comprising a member adapted to be fixedly positioned with respect to said other knuckle for movement therewith relative to said circuit component and said piston means; said member including cam means formed thereon engageable with the cam means on piston means to produce axial movement thereof and operation of said plunger, as an incident to movement of said hinge leaves.*

*6. A hinge construction as defined in claim 5, wherein said electrical circuit component is a switch and there is provided lead wires extending exteriorally of said hinge adapting said switch for connection in an electrical circuit.*

*7. A hinge construction according to claim 5, further including means for adjustably fixing the position of said operating means member so as to provide an initial positioning upon a pre-selected orientation of said hinge leaves.*

*8. A hinge construction comprising first and second hinge leafs, each leaf including at least one hinge knuckle which knuckles are juxtaposed in the assembled condition, means for maintaining said hinge leaves in an assembled condition, and an electrical switch carried within one of said knuckles and including a plunger for the operation thereof, operating means carried within the other of said knuckles, and actuator means disposed between said operator means and said switch plunger, which actuator means is operatively and non-rotatably engaged with said switch, while being free to move axially to achieve movement of said plunger, and cam means carried by said operating means and said actuator means capable of producing axial movement of said plunger upon relative movement of said hinge leaves, as would be occasioned upon the opening or closing of a door, said switch, operating means and actuator means being entirely housed within said juxtaposed knuckles and thus being concealed from view when said hinge is in the assembled condition, said actuator means comprising piston means non-rotatably mounted with respect to said switch, but being movable axially with respect to said switch for engagement and operation of said plunger.*

* * * * *